Feb. 12, 1963 E. B. JACOBSON 3,077,142
REMOTE CONTROL STRUCTURE FOR REARVIEW MIRRORS AND THE LIKE
Filed June 8, 1959 3 Sheets-Sheet 3

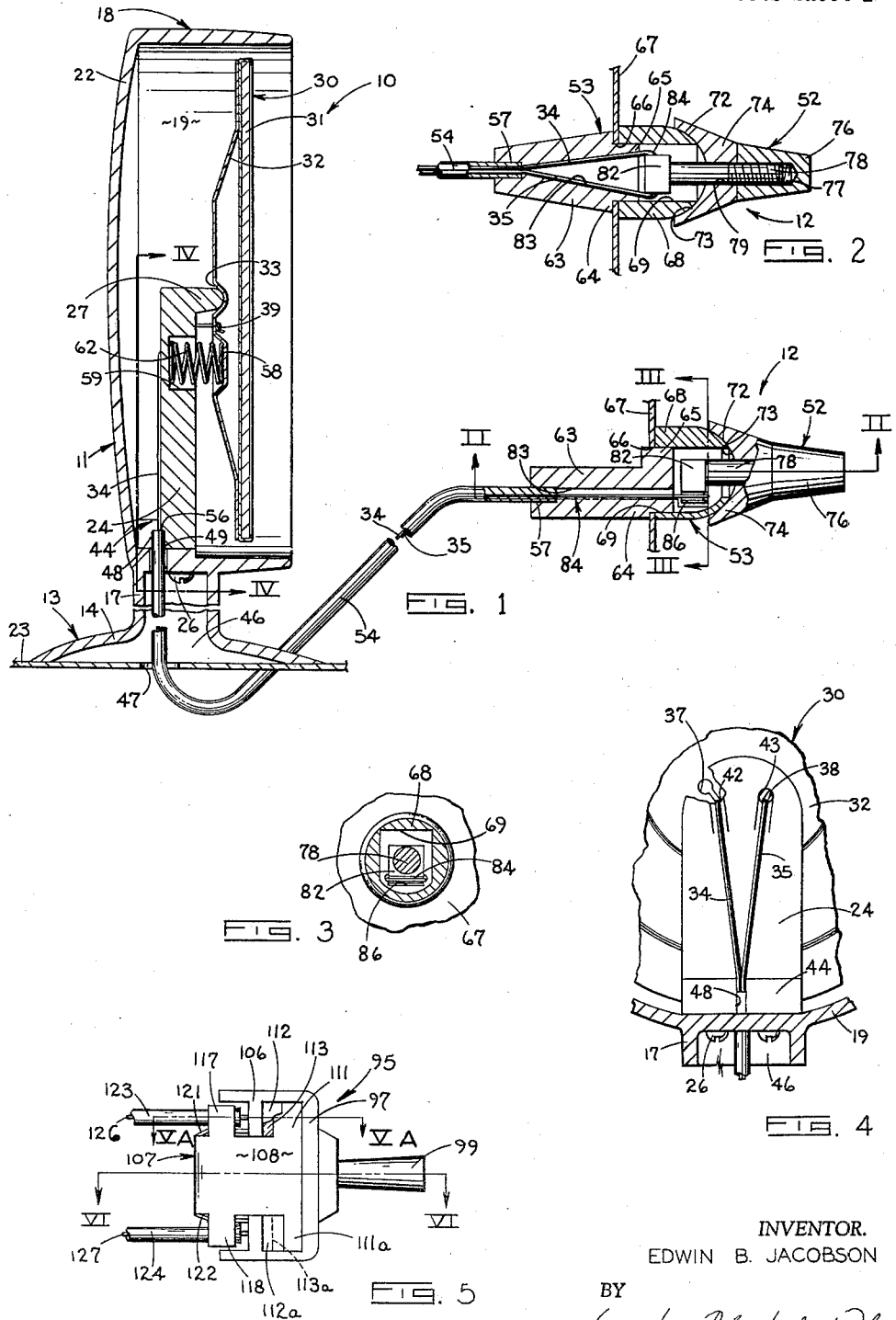

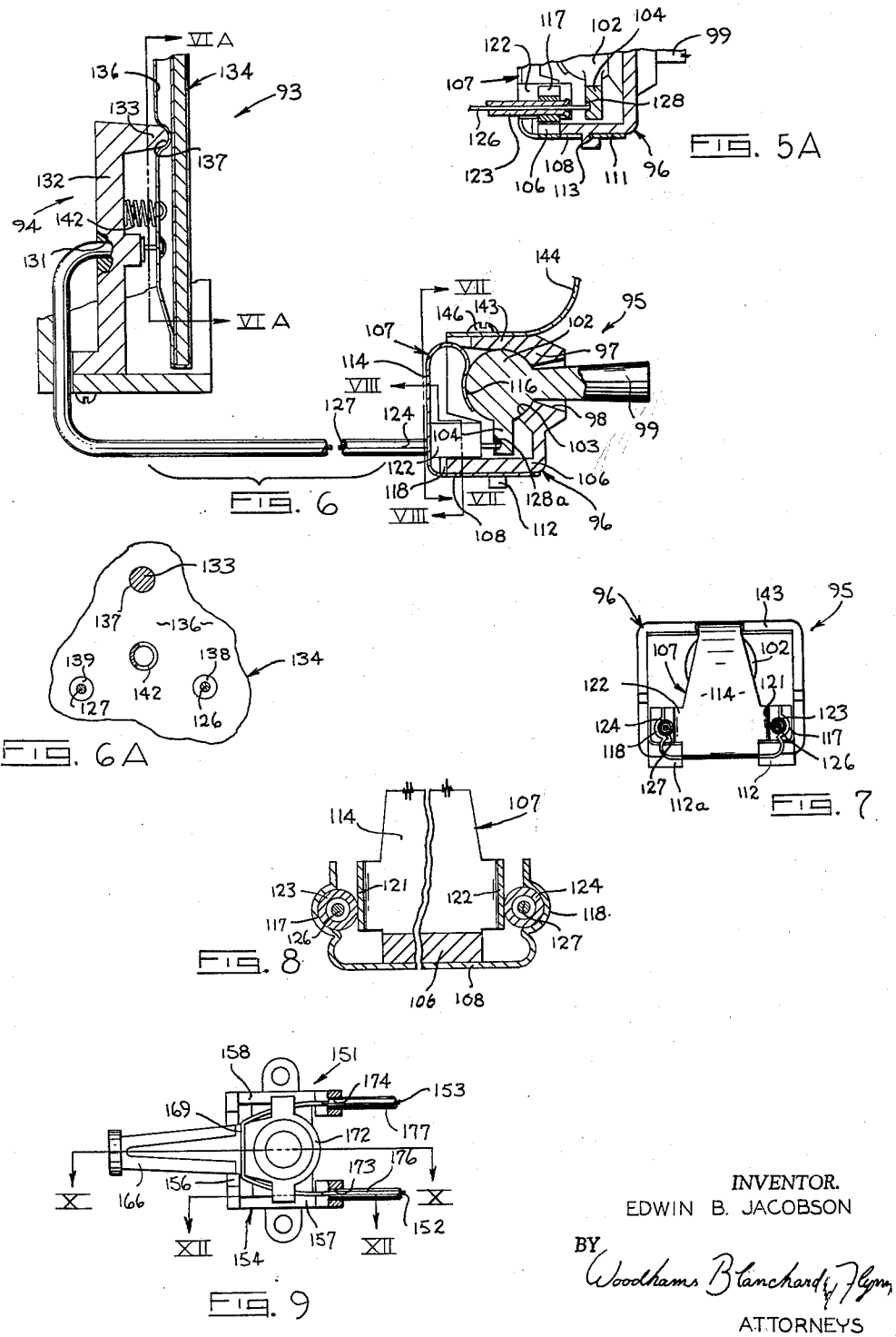

INVENTOR.
EDWIN B. JACOBSON
BY
*Woodhams Blanchard & Flynn*
ATTORNEYS

United States Patent Office 3,077,142
Patented Feb. 12, 1963

3,077,142
REMOTE CONTROL STRUCTURE FOR REARVIEW MIRRORS AND THE LIKE
Edwin B. Jacobson, Grand Rapids, Mich., assignor to Jervis Corporation, Grandville, Mich., a corporation of Michigan
Filed June 8, 1959, Ser. No. 818,669
13 Claims. (Cl. 88—93)

This invention relates in general to a remotely adjustable rearview mirror for an automotive vehicle and, more particularly, to a manually operable, mechanical device for effecting the remote control of said adjustable mirror in four different directions or any combination thereof by means of only two elongated flexible elements.

The need for an adjustable rearview mirror assembly having a simple and inexpensive, manually operable, mechanism for remotely effecting adjustment of the reflective member of said mirror assembly has long existed. The advantages of a remotely adjustable rearview mirror for an automotive vehicle are well known. For example, when the reflective member is inside of the operator's compartment, it frequently obstructs the view of the operator and, moreover, its use is often limited by parts of, or other occupants within, said vehicle. Heretofore, it has been necessary to tolerate these inconveniences in order to have the reflective member within the reach of the operator for the purpose of adjustment. Where the adjustable reflective member of existing rearview mirrors is placed outside of the operator's compartment, adjustment often requires the services of a second person who moves the reflective member according to the operator's instructions.

Many attempts have been made to provide a mechanism for remotely adjusting a rearview mirror, but none have met with commercial success, insofar as it can be determined, prior to the recent developments made by, and in behalf of, the assignee of this application. The apparent lack of acceptance is believed to be due primarily to the complex nature of the remote controlling mechanism in previously known remotely adjustable mirrors. Because of the complex nature of such mechanisms, the mirror assemblies have been costly, difficult to install, difficult to maintain, and have often required custom construction for a particular installation.

In a continuing effort to advance the improvement and development of remotely adjustable, rearview mirror assemblies, it was found that adjustment of the reflective member around two transverse axes which are substantially parallel with the reflective surface can be effected by means of a pair of elongated, flexible elements combined with a reaction member such as a flexible casing structure. In this invention, the casing and elements are subjected to relative and continuous tension and compression lengthwise thereof between the slave unit and the manually operable control unit.

Accordingly, a primary object of this invention has been the provision of a manually operable mechanism for remotely adjusting the reflective member of an adjustable rearview mirror assembly, which is particularly designed for use on an automotive vehicle, which is completely, quickly and easily adaptable to installation on a variety of different types and styles of automotive vehicles and in various positions upon said vehicles, and which requires only two elongated, flexible elements and a cooperating reaction member, such as a surrounding casing structure, for effecting such remote control.

A further object of this invention has been the provision of a manually operable mechanism, as aforesaid, wherein said reaction member is held under substantially continuous compression or tension with respect to said elements by resilient means disposed between said reflective member and said reaction member.

A further object of this invention has been the provision of a manually operable mechanism, as aforesaid, which is extremely easy to operate, which involves a minimum of cost both to manufacture and to install, which is foolproof in its operation, which can be quickly and easily assembled or disassembled without special tools whereby to effect convenient installation, change in installation or replacement of damaged parts resulting, for example, from an accident.

A further object of this invention has been the provision of a manually operable control mechanism, as aforesaid, which is pleasing in appearance, which requires a minimum of space, which includes a manually engageable actuator that can be installed conveniently and attractively on the dash board of the vehicle within easy reach of the vehicle operator, which involves completely mechanical linkage so that no auxiliary power supply is required for its operation, and which will give continuous maintenance-free performance for long periods of time, even under rigorous conditions of operation.

Other objects and purposes of this invention will become apparent to persons acquainted with this type of device upon reading the following specification and examining the accompanying drawings, in which:

FIGURE 1 is a partially broken, substantially central cross-sectional view of a remotely adjustable rearview mirror assembly including the remote control device embodying the invention.

FIGURE 2 is a sectional view substantially as taken along the line II—II in FIGURE 1.

FIGURE 3 is a sectional view substantially as taken along the line III—III in FIGURE 1.

FIGURE 4 is a sectional view taken along the line IV—IV in FIGURE 1.

FIGURE 5 is a bottom view of a fragment of an alternate remote control device embodying the invention.

FIGURE 5A is a sectional view taken along the line VA—VA in FIGURE 5.

FIGURE 6 is a sectional view substantially as taken along the line VI—VI in FIGURE 5 and includes a fragment of a reflective member and its support.

FIGURE 6A is a sectional view taken along the line VIA—VIA in FIGURE 6.

FIGURE 7 is a sectional view taken along the line VII—VII in FIGURE 6.

FIGURE 8 is a sectional view taken along the line VIII—VIII in FIGURE 6.

FIGURE 9 is a broken, bottom view of an alternate construction for a remote control device embodying the invention.

Figure 14:
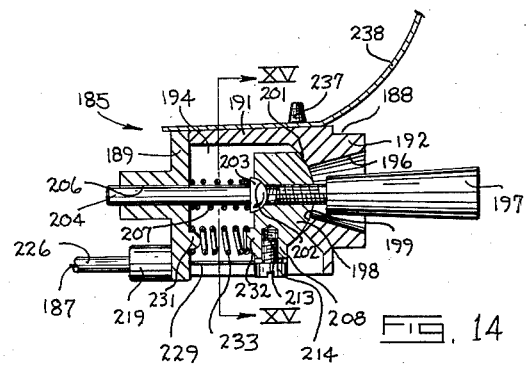
FIGURE 14 is a sectional view taken along the line XIV—XIV in FIGURE 13.

For convenience in description, the terms "upper," "lower," and derivatives thereof will have reference to the rearview mirror assembly and parts thereof as appearing in FIGURES 1, 6 and 14, which are their normal positions of operation. The terms "front," "rear"

and derivatives thereof will have reference to the normal direction of movement of a vehicle on which the remotely adjustable rearview mirror assembly of the invention is mounted, and will specifically refer to the leftward and rightward ends, respectively, of the assembly appearing in FIGURE 1. The terms, "inner," "outer" and derivatives thereof will have reference to the geometric center of said rearview mirror assembly and parts thereof.

General Description

The objects and purposes of the invention, including those set forth above, have been met by providing a remotely controllable rearview mirror assembly comprised of a controlled or slave unit including an adjustable image reflecting member and a remotely disposed master unit or control device for effecting adjustment of the reflective member. The slave unit, in one particular embodiment, includes a pedestal upon which a cup-shaped rearwardly opening hood is mounted. The reflective member, which is preferably substantially flat, is disposed within the hood and is pivotally engaged by a pivot projection which is secured to and within the hood. A pair of elongated flexible elements are secured at adjacent ends thereof to the back of the reflective member at points spaced from each other and from the center of contact between the reflective member and the pivot projection. The elongated elements, which may be the two halves of a folded cable, are connected near their other ends to the actuating member of said control device. Said elements are closely associated with an elongated reaction member, such as a surrounding casing, which extends between the slave unit and the body of the control device.

Resilient means is disposed between the reflective member and the structure which engages the adjacent end of said casing and supports said reflective member so that the elongated elements are continuously subjected to lengthwise tension or compression with respect to said casing. Said resilient means also serves both to pivot the reflective member in one direction and to increase the friction between the casing and elements whereby the reflective member is held in any selected position. This relative tension or compression between the casing, or other reaction member, and the control elements permits four-way or substantially universal control of the reflective member by means of only two control elements. The actuating member of the control device is supported upon the body member thereof for pivotal movement about at least two substantially perpendicularly disposed axes, and such movement causes the elongated elements to effect a similar movement of the reflective member around corresponding axes.

Detailed Construction

The remotely controllable rearview mirror assembly 10 (FIGURE 1), which is herein selected to illustrate one particular embodiment of the invention, is comprised of a slave unit 11 remotely connected to a master unit or control device 12. The slave unit 11 includes a base member comprising a mounting plate 14 and an upstanding pedestal 17 having a sidewardly opening, cup-shaped hood 18 supported upon the upper end thereof. Said hook 18 has a substantially cylindrical side wall 19, to which said pedestal 17 is secured, and a circular front wall 22 opposite the open end of said hood. The mounting plate 14 may be supported upon and secured to means, such as the fender 23 of an automotive vehicle, not shown.

A support post 24 (FIGURES 1 and 4) is mounted upon the inner surface of the side wall 19 by the screws 26, for example, which extend through the side wall 19, preferably adjacent to the pedestal 17, and threadedly engage the lower end of said post 24. A pivot projection 27 is secured to the upper or free end of the post 24 and extends rearwardly therefrom along the central axis of said side wall 19, hence of the hood 18. The rearward end of the projection 27 is preferably substantially hemispherical in shape.

A reflective member 30 (FIGURE 1), which is preferably substantially flat and circular in this particular embodiment, includes a mirror 31 mounted upon a back plate 32 having a centrally disposed pivot recess 33. Said recess 33 is preferably shaped to define a portion of a hemisphere having substantially the same radius as the hemispherical end of the pivot projection 27, which is pivotally received into said recess 33.

A pair of elongated, flexible control elements 34 and 35 (FIGURE 4) are secured at the front ends thereof to said back plate 32 preferably at points thereon spaced from each other and from the center of the pivot recess 33. Such connection may be effected by providing keyhole-shaped slots 37 and 38 in the back plate 32 (FIGURE 4) so that their narrow ends are closer together than their enlarged ends. The control elements 34 and 35 are provided with enlargements 39 (FIGURE 1) which are receivable through the enlarged portions, only, of the slots 37 and 38, after which said control elements are then moved into the adjacent, narrower ends of said slots whereby disengagement of the control elements from the back plate is positively prevented by the enlargements 39.

The support post 24 (FIGURE 4) has a pair of guide openings 42 and 43 which are simultaneously and axially alignable with the adjacent narrow ends of the slots 37 and 38, respectively, for slidable reception and guiding of the control elements 34 and 35, respectively. Said guide openings are curved downwardly at their front ends so that they smoothly join the front surface of said post 24, which has a frontwardly extending flange 44 at its lower end.

The base member 13 has a passageway 46 (FIGURE 1) which extends through the pedestal 17 and the mounting plate 14 and communicates with an opening 47 in the fender 23. The flange 44 of the post 24 has a slot 48, and the side wall 19 has an opening 49 which communicates between the slot 48 and the passageway 46. The control elements 34 and 35 extend through the slot 48, the opening 49 and the passageway 46 for connection to the actuating member or lever 52 supported upon the body member 53 of the control device 12.

The control elements 34 and 35 (FIGURE 1) are snugly and slidably embraced by an elongated casing 54, one end of which is received through the passageway 46 and opening 49 into a casing recess 56 in the lower surface of the flange 44, which recess communicates with the slot 48. The other end of the casing 54 is received into a casing recess 57 in the body member 53 of the control device 12.

The back plate 32 is provided with a spring recess 58 (FIGURE 1), the center of which is preferably located so that the center line through the pivot recess 33 and said spring recess 58 passes approximately midway between the adjacent, narrow ends of the slots 37 and 38. The support post 24 also has a spring recess 59 which is aligned with the spring recess 58. A spiral spring 62 is received into, and preferably held under compression between, the end walls of said spring recesses 58 and 59. Accordingly, the spring 62 urges the adjacent portion of the reflective member 30 away from the post 24; and the control elements 34 and 35 limit such urging.

The body member 53 (FIGURES 1 and 2) of the control device 12 has a front section 63, the rear end 65 of which is of reduced cross-sectional dimension to provide the shoulder 64. The said rear end 65 of the section 63 is receivable through an opening 66 in the dash panel 67, for example, of a conventional automotive vehicle, not otherwise shown. The body member 53 also has a rear section 68 (FIGURES 1 and 2) having a central opening 69 therethrough into which the rear end 65 of section 63 is snugly and slidably receivable. The rearward end of the rear section 68 has a hemispherical convex surface 72 surrounding the central opening 69 and engaged by the concave, substantially hemispherical surface 73 on the front portion 74 of the actuating lever 52. The rear portion 76 of the actuating lever 52 has a threaded recess 77 into which the threaded end of the control rod 78 is threadedly received. The front portion 74 has a central opening 79 through which the control rod 78 is slidably received, said rod 78 having a control head 82 on its inner end and spaced from the concave surface 73 on said front portion 74.

The front section 63 of the body member 53 has a rearwardly expanding cable slot 83 which is smaller than, and communicates at its inner end with, the rear end of the casing recess 57 in said front section 63. In this particular embodiment, the control elements 34 and 35 are halves of a single cable which is folded upon itself approximately midway between its ends to provide a loop 84 which extends through the rearward end of the cable slot 83. The control head 82 extends sidewardly from the control rod 78 and has an arcuate groove 86 in its rearward and sideward faces into which the loop 84 is snugly received, the lengthwise axis of the cable slot 83 being disposed to one side of, here below, the center of the hemispherical surfaces 72 and 73 for alignment with the groove 86.

*Assembly and Operation*

Assembly of the rearview mirror assembly shown in FIGURE 1 is accomplished by connecting the control elements 34 and 35 to the reflective member 30, preferably before the slave unit 11 is mounted upon the structure, such as the fender 23, supporting this unit. The control elements and their surrounding casing 54, which extend through the base member 13, are then adjusted so that said casing 54 is snugly received into the casing recess 56 and the spring 62 is held under some compression between the reflective member 30 and the post 24. The mounting plate 14 is then secured in place upon the fender 23.

An appropriate opening 66 (FIGURES 1 and 2) is provided in a dash panel 67 for reception of the rear end 65 of the front section 63 of the body member 53. The loop 84 is disposed within the cable slot 83 in said front section 63 and the adjacent end of the casing 54 is snugly received into the casing recess 57. The rear section 68 of the body member 53 is sleeved upon the rear end 65 of the front section 63 so that the portion of the dash panel 67 surrounding the opening 66 therein is received between the shoulder 64 on the front section and the front end of the rear section 68. The parts are held as appears hereinafter.

The head 82 on the control rod 78 (FIGURE 1), which is disconnected from the rear portion 76 of the actuating lever 52, is positioned within the central opening 69 in said rear section 68. The lower end of the reflective member 30 is moved toward the post 24, thereby compressing the spring 62 so that the maximum amount of the loop 84 will extend beyond the rear end of the front section 63 into the opening 69. The grooved portion of the control head 82 is inserted through the loop 84 so that the loop can move into the groove 86. The front portion 74 of the actuating lever 52 is now sleeved upon the control rod 78 after which the rear portion 76 of said lever is threadedly engaged with the control rod 78. The rear portion 76 of the lever 52 is tightened upon the rod 78, which imposes a tension upon the elements 34 and 35, and thereby compresses the spring 62 and the casing 54 lengthwise thereof. Such tightening is preferably terminated when the reflective member 30 is parallel with the front wall 22 and the actuating lever 52 is substantially perpendicular to the dash panel 67, from which position said lever can be pivoted in any direction.

The tension on the elements 34 and 35 clamps the panel 67 between the front section 63 and the rear section 68 of the body member 53, which latter is in turn clamped between the casing 54 and the actuating lever 52. The tension on the control elements 34 and 35 also creates the friction between these elements and casing 54 whereby the reflective member 30 tends to remain in any position into which it is adjusted by the lever 52, unless positively moved. Additional securing means, such as radially positioned connecting screws (not shown) may, if desired, be provided between the front and rear sections 63 and 68 both with respect to each other and with respect to said dash panel 67.

Downward pivoting of the lever 52 will permit the control elements 34 and 35 to move through the body member 53 and through the support post 24, whereby the lower end of the reflective member 30 is moved rearwardly by the compressed spring 62. Upward pivoting of the lever 52 pulls the control elements 34 and 35 rearwardly, thereby compressing the spring 62 and causing the lower end of the reflective member 30 to move frontwardly. Thus, movement of the lever 52 around a substantially horizontal axis will effect a corresponding movement of the reflective member 30 around a horizontal axis.

Movement of the lever 52 sidewardly in either direction will cause one of the control elements 34 and 35 to be moved rearwardly and the other to be moved forwardly, through the cable slot 83. Such movement will effect a corresponding pivotal movement of the reflective member 30 around a substantially vertical axis. Combinations of these movements of the reflective member 30 about said horizontal and vertical axes can be effected by moving the lever 52 in directions which are combinations of vertical or horizontal.

The reflective member 30 will tend to remain in any selected position in which it is placed by operation of the actuating lever 52, in spite of vibrations and minor shocks which might otherwise tend to alter the position of said reflective member, due to the friction between the casing 54 and the control elements 34 and 35.

Dismantling of the mirror assembly 10 (FIGURE 1), which can be effected by reversing the assembly procedure set forth above, may be commenced by disconnecting the rear portion 76 of the lever 52 from the control rod 78. It will be apparent that the control device 12, including the control elements 34 and 35 and the casing 54 in which they are disposed, may be used in conjunction with a variety of different types of slave units, several of which are disclosed in a copending application Serial No. 777,887 filed on December 3, 1958 and assigned to the assignee of this application.

*Alternate Construction*

An alternate master unit or control device 95, which is illustrated in FIGURES 5, 6, 6a, 7 and 8, may be utilized for the purpose of remotely controlling the slave unit 94 of a rearview mirror assembly 93, which may be similar to the slave unit 11 shown in FIGURE 1. Said control device 95 includes a substantially cup-shaped, frontwardly opening body member 96 having a rear wall 97 with a conically shaped, rearwardly diverging lever opening 98. The lever 99, which extends through the opening 98, has on its frontward end a coaxial, spherical head 102 which is pivotally received into a substantially hemispherical cavity 103 in the inner surface of the rear wall 97 surrounding the lever opening 98. Said cavity 103 has a radius which is preferably about equal to the radius of the head 102. A flange 104 is secured to and extends downwardly from the head 102, and is spaced from the rear wall 97 when the lever 99 is substantially centered in the opening 98.

A substantially L-shaped spring clip 107 (FIGURES 5, 6 and 7) includes a bottom plate 108 having a pair of sidewardly extending ears 111 and 111a near the rearward edge thereof. The bottom wall 106 of the body member 96 has a pair of downwardly extending bosses 112 and 112a between which said plate 108 extends, said bosses having rearwardly opening slots 113 and 113a (FIGURES 5 and 5a) into which the ears 111 111a, respectively, are snugly and slidably received. The spring clip 107 has a substantially vertical front plate 114 with an integral, downwardly curving tongue 116 extending rearwardly and downwardly from its upper edge, which tongue engages the front surface of the lever head 102 whereby said head is urged into the cavity 103. The tongue being resilient is held under stress against the head 102 by the engagement between the ears 111 and 111a and the bosses 112 and 112a.

The bottom plate 108 FIGURES 5 and 8) also has a pair of sidewardly and upwardly extending, integral gripping arms 117 and 118. The front plate 114 has a pair of integral pressure arms 121 and 122 which extend toward the flange 104 and are disposed between the gripping arms 117 and 118 and respectively near thereto. A pair of elongated, hollow cable casings 123 and 124 are disposed (FIGURE 8) between each pair of gripping and pressure arms 117 and 121, and 118 and 122, respectively. The said cable casings 123 and 124 are fabricated from stiff material and the ends thereof are flared to prevent frontward movement with respect to the gripping arms 117 and 118. A pair of elongated, flexible control cables or elements 126 and 127 are slidably and snugly disposed within the cable casings 123 and 124, respectively, and extend from the rearward ends thereof for reception into a pair of spaced element recesses 128 and 128a (FIGURES 5A and 6, respectively) in the front face of the flange 104.

The front ends of the cable casings 123 and 124 (FIGURES 5A and 6) extend through suitable openings 131 in the support post 132 of the slave unit 94. Said support post has a pivot projection 133 near its upper end. A reflective member 134, which may be generally similar to the reflective member 30 in FIGURE 1, includes a back plate 136 having a pivot recess 137 (FIGURE 6) into which said projection 133 is pivotally received. Said back plate also has a pair of element recesses 138 and 139 (FIGURE 6A) which are spaced from each other and from the pivot recess 137, and into which the front ends of the control elements 126 and 127, respectively, are received. The front ends of the cable casings 123 and 124 are flared on the rearward side of the support post 132 to prevent disengagement of the cable casings therefrom.

A spiral spring 142 (FIGURES 6 and 6A) extends between, and is connected at its opposite ends, to the back plate 136 and the support post 132. The point of connection between the spring 142 and the back plate 136 is along a line connecting the center of the pivot recess 137 and approximately the center of a line connecting the element recesses 138 and 139. The spring 142, which is held under tension, urges the control elements 126 and 127 rearwardly through the casings 123 and 124 against the flange 104 on the lever 99. Such urging tends not only to subject the elements 126 and 127 to lengthwise compression but, at the same time, subjects the casings 123 and 124 to lengthwise tension. This is due to the fact that the opposite ends of the casings 123 and 124 are held with respect to the body member 96 and the post 132. Thus, the elements 126 and 127, which are positively urged into the opposite ends of the casings 123 and 124, tend to urge a stretching of said casings. The control elements and casings are fabricated from materials which are not materially altered in their length as a result of the tension and compression to which they are subjected by the spring 142.

The alternate structure illustrated in FIGURE 6 differs in concept from the structure illustrated in FIGURE 1 in that the control elements 126 and 127 are subjected to lengthwise compression whereas the control elements 34 and 35 are subjected to tension. However, the results which are produced are substantially similar. That is, when the lever 99 is moved downwardly with respect to the body member 96, the flange 104 moves the control element 126 and 127 forwardly through their respective casings, thereby urging the lower end of the reflective member 134 away from its supporting post 132 against the contrary urging of the spring 142. Upward movement of the lever 99 permits the elements 126 and 127 to move rearwardly as a result of the urging by the spring 142, whereby the lower end of the reflective member 134 is moved toward the post 132. A sideward movement of the lever 99 in either direction causes one control element to move frontwardly while permitting the other element to move rearwardly within their respective casings thereby causing the reflective member 134 to pivot around a substantially vertical axis in a corresponding manner. Thus, by pivoting the lever 99 around any given axis passing substantially through the center of the head 102, the reflective member 134 is simultaneously pivoted around a corresponding axis passing through the center of curvature of the recess 137.

The upper wall 143 of the body member 96 may be secured to the lower edge of a dash panel 144 of an automotive vehicle, not shown, by means of the screw 146, which is threadedly received into the upper wall 143.

Figure 10:
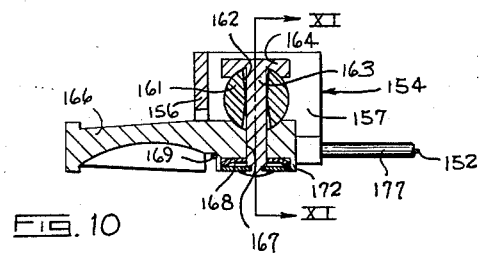
FIGURE 10 is a sectional view taken along the line X—X in FIGURE 9.
Figure 11:
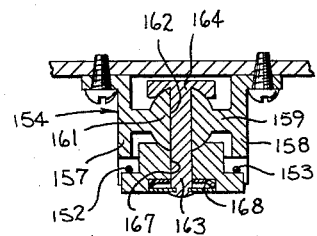
FIGURE 11 is a sectional view substantially as taken along the line XI—XI in FIGURE 10.

The further alternate control device 151 (FIGURES 9, 10, 11 and 12) is designed for use with a slave unit, which may be substantially identical to the slave unit 11, wherein the control elements are secured to the reflective member. The control device 151, which operates said slave unit by means of a pair of elongated flexible elements 152 and 153 (FIGURE 9), is comprised of a substantially U-shaped body member 154 having a rear wall 156 and a pair of side walls 157 and 158. The side walls are connected by an integral bar 159 (FIGURE 11) having a spherical enlargement 161 substantially at the middle thereof. The sphere 161 has a vertical pin opening 162 (FIGURES 10 and 11) which diverges in directions parallel with said side walls 157 and 158 both upwardly and downwardly from approximately the center thereof. A pivot pin 163 having a head 164 at its upper end is received through the pin opening 162. An actuating lever 166 has an opening 167 near one end through which the lower end of the pin 163 is received for engagement by the locking clip 168 to prevent disengagement of the pin 163 from the lever 166. The pin head 164 and lever 166 have concave surfaces on their adjacent sides which snugly and slidably embrace the sphere 161. The lever 166, is, therefore, pivotable around one axis passing through the center of the sphere 161 lengthwise of the bar 159, and around another axis passing through the center of the sphere 161 lengthwise of the pivot pin 163.

The elements 152 and 153 may be part of a single cable which is bent upon itself midway between its ends to form a loop 169, as shown in FIGURE 9. The lever 166 has an integral boss 172 extending downwardly from the front end thereof through which the pin 163 extends. The boss 172 is received through, and its rear and side edges are engaged by, the loop 169.

Figure 12:
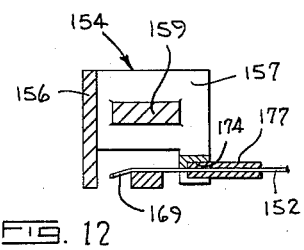
FIGURE 12 is a sectional view taken along the line XII—XII in FIGURE 9.

The side walls 157 and 158 (FIGURE 9) have near their front ends a pair of cable recesses 173 and 174 into which the ends of the cable casings 176 and 177, respectively, are snugly received (FIGURE 12). Said cable casings snugly and slidably embrace the elements 152 and 153 between the body member 154 and the support structure of a slave unit, such as the post 24 in FIGURE 1.

Vertical movement of the lever 166 about a substantially horizontal axis through the center of the sphere 161 causes the elements 152 and 153 to effect a corresponding pivotal movement of a reflective member, such as the member 30 in FIGURE 1, around one axis. Sideward pivotal movement of the lever 166 around the axis of the pivot pin 163 operates through the elements 152 and 153 to effect a corresponding pivotal movement of said reflective member around another axis transverse of said one axis. The control elements 152 and 153 are held under tension and the casings 176 and 177 are subjected to a corresponding compression by resilient means, such as the spring 62 in FIGURE 1, in a manner substantially as set forth above with respect to the corresponding parts in the mirror assembly 10.

Figure 13A:
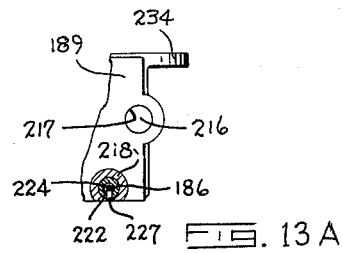
FIGURE 13A is a sectional view taken along the line XIIIA—XIIIA in FIGURE 13.
Figure 13:
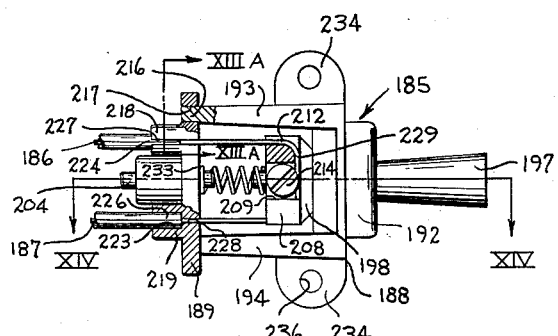
FIGURE 13 is a broken, bottom view of a further alternate construction for a remote control device embodying the invention.
Figure 15:
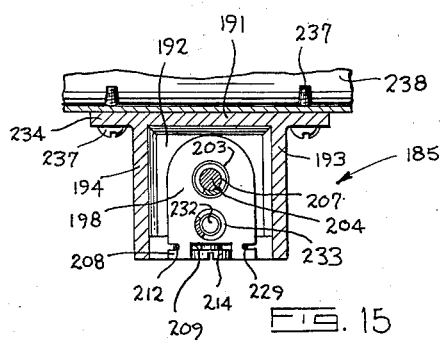
FIGURE 15 is a sectional view taken along the line XV—XV in FIGURE 14.

FIGURES 13, 14 and 15 illustrate a still further alternate master unit or control device 185 arranged for the purpose of effecting selective movement of a pair of elongated control elements 186 and 187 which are positively connected to a remotely disposed and pivotally supported reflective member, such as the member 30 in FIGURE 1. The control device 185 has a downwardly opening substantially cup-shaped body member 188 including a front wall 189, a top wall 191, a rear wall 192 and a pair of side walls 193 and 194. The rear wall has a centrally located, rearwardly diverging and conical opening 196 through which the lever 197 is loosely received. The lever 197 is threaded at its forward end for threaded reception into a pivot head 198 disposed within the body member 188. The rear wall 192 has a concave surface 199 surrounding the pin opening 196 and defining a portion of a sphere. The pivot head 198 has a corresponding convex surface 201 adjacent to and concentric with said concave surface 199. The side of said pivot head 198 remote from the convex surface 201 has a substantially hemispherical cavity 202 into which the hemispherical head 203 of the pressure pin 204 is pivotally and snugly received, the center of curvature of the cavity 202 and of the head 203 being substantially coincident with that of the concave surface 199 and the convex surface 201. The pressure pin is slidably disposed within a pin opening 206 in the front wall 189, which opening is preferably coaxial with the lever opening 196 in the rear wall 192. Resilient means such as the spiral spring 207 is sleeved upon the pressure pin 204 between its head 203 and the front wall 189 and is normally held under compression therebetween for the purpose of causing said head 203 to positively urge the pivot head 198 against the surface 199 on rear wall 192. Thus, the pivot head 198 is snugly and slidably disposed between the pin head 203 and rear wall 192 for pivotal movement around the center of curvature of the concave and convex surfaces 198 and 201, and of the pin head 203.

The pivot head 198 has a downwardly extending flange 208 having a recess 209 in its lower edge preferably approximately midway between the side walls 193 and 194. Said flange 208 also has a substantially horizontally disposed groove 212 (FIGURES 13 and 15) in the sides and rear thereof which communicates with the recess 209. A centrally disposed, threaded opening 213 extends upwardly into the flange 208 from the recess 209 for threaded reception of a screw 214, the head of which is received into the recess 209.

The front wall 189 (FIGURES 13 and 13A), which is separable from the remainder of the body member 188 in this particular embodiment, is secured to the side walls 193 and 194 by a pair of integral projections 216 which extend from the front edges of the side walls 193 and 194 for reception into openings 217 in the front wall 189. The outer ends of said projections 216 are swedged, clinched, or otherwise upset to prevent disconnection thereof from the front wall 189.

Said front wall 189 (FIGURE 13) has near its lower edge a pair of frontwardly extending bosses 218 and 219 containing frontwardly opening casing recesses 222 and 223 (FIGURES 13A and 13, respectively) into which the ends of the cable casings 224 and 226 are snugly and slidably received. The bosses 218 and 219 have cable slots 227 and 228 (FIGURE 13) in their lower edges which also extend through the adjacent lower edges of the front wall 189 and communicate with the casing recesses 222 and 223, respectively. The control elements 186 and 187, which are snugly but slidably disposed within the casings 224 and 226, preferably are substantially equal portions of an elongated cable, which is folded upon itself approximately midway between the ends thereof to form a loop 229 snugly received into the groove 212. The screw 214 is tightened (FIGURE 15) into the recess 209 to engage that portion of the loop 229 which extends therethrough, thereby preventing lengthwise movement of the control elements 186 and 187 with respect to the flange 208.

The front wall 189 (FIGURE 14) and the flange 208 have on their facing sides substantially coaxial projections 231 and 232 which extend toward, but are spaced from, each other. The end portions of a spiral spring 233 are sleeved upon the projections 231 and 232 and, when the lever 197 is in a substantially neutral position, as shown in FIGURES 13 and 14, the spring 233 is preferably under some compression between the front wall 189 and the flange 208. Accordingly, the spring 233 tends to subject the control elements 186 and 187 to a tension. Such tension is made possible by the cable casings 224 and 226, which abut at their front ends against structure, such as that shown in FIGURE 1, with which the other ends of the control elements 186 and 187 are operatively associated.

The side walls 193 and 194 have a pair of sidewardly extending flanges 234 having screw openings 236 through which screws 237 (FIGURE 15) are slidably received for threaded engagement with appropriate openings in means, such as the lower edge of a dash panel 238, upon which the control device 185 is supported.

The control device 185 of FIGURES 13 to 15, inclusive, is assembled for operation by inserting the pressure pin 204 into its pin opening 206 with the spring 207 sleeved thereon after which the pivot head 198 is inserted through the lower open side of said body member 188 and disposed between the pin head 203 and the rear wall 192. The lever 197 is inserted through the conical opening 196 and threadedly engaged with the pivot head 198, and urged forwardly as far as it will go so that the flange 208 can be inserted into the loop 229. The screw 214 is then tightened in place to prevent dislocation of the loop 229 from the flange 208. The length of the cable comprising the control elements 186 and 187 is selected in advance and with respect to the length of the cable casings 224 and 226 so that the lever 197 will be in the neutral position (FIGURES 13 and 14) when the apparatus, such as the reflective member 30 in FIGURE 1 to which the elements 186 and 187 are secured, is in its neutral position. The spring 233 is selected so that it will subject the control elements 186 and 187 to a tensioning force and will subject the casings 224 and 226 to a compressive force. The casings and control elements are made from materials which can receive such forces thereon without material, if any, change in the length of the elements and the casings. The friction between the cable casings and the control elements, which is augmented by the compressive and tensioning forces, will tend strongly to hold the lever 197 and the apparatus which it is operating in any selected position into which said lever is moved and the spring 233 will not alter such position.

The casing 54 (FIGURE 1) and the casings 123 and 124 (FIGURE 5) serve as reaction members, the former being under lengthwise tension and the latter under lengthwise compression. Under some circumstances, the reaction member could be in the form of a stiff, but flexible, wire and the control elements could be a pair of telescoped tubes slidably sleeved upon said wire.

It will be apparent from the variety of different control devices disclosed herein, that other variations in construction will be suggested within the fundamental concept of the invention. Accordingly, although particular preferred embodiments of the invention have been disclosed in detail above for illustrative purposes, it will be understood that variations or modifications of such dis-

What is claimed is:

1. A remote control structure for rearview mirrors comprising:
   (a) a planar reflective element;
   (b) a post spacedly behind said reflective element;
   (c) a universal pivot connection intermediate said post and said reflective element;
   (d) spring means between said post and said reflective element located in offset relation from said universal pivot;
   (e) a pair of elongate flexible members in spaced apart relation connected to said reflective element, one on either side of said spring means;
   (f) a jacket about said elongate members, the ends of said jacket being secured at one end to said post;
   (g) an actuator structure remote from said reflective element and receiving the other of said ends of said jackets;
   (h) a universal connection in said actuator and connected to said elongate flexible members;
   (i) means in said actuator applying selected equal stresses to said elongate flexible members and counter stress to said jackets; and
   (j) handle means extending from said actuator and connected to said universal connection whereby movement of all of said stressed flexible members is accomplished with corresponding motion of said reflective element.

2. In a rearview mirror construction including a reflective member and mounting structure pivotally supporting said reflective member for movement around a first pair of transverse pivot axes, control mechanism for remotely adjusting the position of said reflective member with respect to said axes, comprising: a pair of elongated flexible elements secured to said reflective member at spaced points thereon defining a line spaced from, and substantially parallel with, one of said first axes; a body member supporting said elements at a substantial distance from said reflective member; a manually operable actuator pivotally supported upon said body member for movement around a second pair of transverse pivot axes, said elements being secured to said actuator at spaced points thereon defining a line spaced from, and substantially parallel with, one of said second axes; casing means closely surrounding said elements and extending from said mounting structure to said body member; resilient means urging movement of said reflective member in one direction around said one axis of said first pair of pivot axes; such movement being opposed by said elements; and means including said resilient means associated with said elements and said casing means for subjecting them to opposing lengthwise stresses, whereby opposing lengthwise stresses occur between said casing means and said elements so that pivotal movement of said actuator with respect to said body member effects a corresponding pivotal movement of said reflective member with respect to the mounting structure thereof.

3. The structure of claim 2 wherein the securing points of said flexible elements upon said reflective member are disposed upon opposite sides of and substantially equally distant from the other of said first axes; and wherein the securing points of said flexible elements to said actuator are located upon opposite sides of and substantially equally distant from the other of said second axes.

4. The structure of claim 2 wherein said elements are subjected to a tensile force and said casings are subjected to a compressive force, lengthwise thereof.

5. In a rearview mirror construction including reflective member and mounting structure pivotally supporting said reflective member for movement around a pair of transverse pivot axes, control mechanism for remotely adjusting the position of said reflective member with respect to said axes, comprising: a pair of elongated flexible elements engaged with said reflective member at spaced points thereon located on the same side of one of said axes and on opposite sides of the other of said axes; a body member supporting said elements at a substantial distance from said reflective member; a manually operable actuator supported upon said body member for movement around a second pair of transverse pivot axes, said elements being engaged by said actuator at spaced points thereon located on the same side of one of said second axes and on opposite sides of the other of said second axes; casing means closely surrounding said elements and extending from said mounting structure to said body members; resilient means urging movement of said reflective member in one direction around said one axis of said first pair of axes; and means effecting a relative tension on one of said casing means and said elements, whereby pivotal movement of said actuator around said second axes effects a corresponding pivotal movement of said reflective member around said first axes.

6. The structure of claim 5 wherein said body member has means defining spaced apart openings extending therethrough which said flexible elements are slidably received, said elements being secured to each other at their rearward ends and an enlarged chamber portion defined by said body, said flexible body member having a convex, substantially hemispherical surface at its rearward end surrounding said openings; and wherein said actuator includes a concave surface slidably engageable with said convex surface and a rod extending coaxially through said concave surface and into the enlarged portion of said body member, said rod having a sidewardly extending flange snugly engageable with the rearward ends of said flexible elements whereby movement of said actuator with respect to said body member around said second axes effects movement of said elements through said opening in said body member.

7. The structure of claim 5 wherein said body member is substantially cup-shaped and has a conically shaped outwardly diverging opening through the closed end wall thereof; the inner surface of said end wall having a hemispherical cavity surrounding said opening and substantially coaxial therewith; wherein said actuator has a substantially spherical head snugly and pivotally receivable within said cavity and having a flange extending sidewardly from said head, said flange having a pair of spaced recesses into which the adjacent ends of said flexible elements are snugly and removably received; and wherein holding means is secured to said body member for resiliently urging said spherical head into said hemispherical cavity, and for snugly gripping the adjacent ends of said casing means whereby movement of said casing means away from said flange is positively opposed.

8. The structure of claim 5 wherein said body member includes a U-shaped shell having a substantially spherical element supported upon, and disposed approximately midway between, the side walls thereof, said spherical element having an opening therethrough substantially parallel with the walls of said shell and diverging in both directions away from the center thereof; and wherein said actuator has a pin extending through the opening in said spherical element, said pin having a head on its free end and said head and said actuator having concave surfaces adjacent to said pin snugly and slidably engaging the adjacent sides of said spherical element, said actuator being secured with respect to said flexible elements and movable at least to a limited extent in any direction around the center of said spherical element.

9. The structure of claim 5 wherein said body member is substantially cup-shaped and has an outwardly diverging, substantially conical opening through one side wall thereof, the inner surface of said side wall having a cavity defining a portion of a sphere substantially coaxial with said conical opening; wherein said actuator includes a lever extending through said conical opening and secured to a head having a convex surface through which said lever extends, said convex surface being snugly and pivotally receivable into said cavity, and said head having a sidewardly extending flange and means for engaging the ends of said flexible elements; wherein the side wall opposite said one side wall has a pair of spaced openings through which the rearward ends of said flexible elements are slidably received, said flexible elements being secured with respect to each other at their rearward ends and said casing means being abutted by said other wall; and wherein first and second resilient means located between said other side wall and said head and flange, respectively, urge said head and flange away from said other side wall, whereby tension is applied to said flexible elements.

10. Mechanism for supporting and adjusting the reflective member of a rearview mirror, comprising in combination: support means supporting said reflective member for movement about a plurality of axes; at least two elongated force-transmitting members connected to said reflective member for effecting movement of said reflective member about one of said axes in response to simultaneous and opposite movement of said force-transmitting members with respect to each other and for movement about another of said axes in response to simultaneous movement of said force-transmitting members in the same direction; control means spaced from said mirror and so arranged that movement of said control means in a first direction will effect simultaneous and opposite movement of said force-transmitting members and movement of said control means in a second direction will effect simultaneous movement of said force-transmitting members in the same direction.

11. Mechanism for supporting and adjusting the reflective member of a rearview mirror, comprising in combination: support means supporting said reflective member for movement about a plurality of axes; at least two elongated force-transmitting members connected to said reflective member for effecting movement of said reflective member about one of said axes in response to simultaneous and opposite movement of said force-transmitting members with respect to each other and for movement about another of said axes in one rotational direction in response to simultaneous movement of said force-transmitting members in the same direction; control means spaced from said mirror and so arranged that movement of said control means in a first direction will effect simultaneous and opposite movement of said force-transmitting members and movement of said control means in a second direction will effect simultaneous movement of said force-transmitting members in the same direction; and means effecting movement of said reflective member oppositely to said one rotational direction upon movement of said control means oppositely to said second direction.

12. A remote control structure for rearview mirrors and the like, comprising: a planar reflective element; a post spacedly behind said reflective element; a universal pivot connection intermediate said post and said reflective surface; spring means between said post and said reflective member located in offset relation from said universal pivot; a pair of elongate flexible members in spaced apart relation connected to said reflective element, one on either side of said spring means and between said spring means and said pivot; a jacket about said elongate flexible members; a master control structure remote from said reflective member and connected to said elongate flexible members; a universal connection on said master control structure whereby selected simultaneous tension or compression is applied to said elongate flexible members and accomplishing corresponding universal movement at said reflective element.

13. A remote control device for a rearview mirror for accomplishing universal movement thereof comprising: a planar reflective element; a back support plate on one side of said reflective element and extending rearwardly thereof, a portion of said rearward extension being parallel to said reflective element, and defining a central pivot recess and a spring receiving recess in spaced apart relation beneath said pivot recess; a post behind said back support plate and including a pivot projection extending into said pivot recess in said support plate, a spring recess defined in said post in substantial register with said spring recess in said support plate, and a pair of slots symmetrically positioned on both sides of said spring recess; a spring in said spring recess providing a bias as between said post and said support plate; a pair of spaced apart elongate flexible elements one through each of said slots in said post and secured at their upper ends to said support plate on either side of said spring recess; a jacket about said flexible elongate means; and a master control remote from said reflective member and secured to said flexible elongate members for selective movement thereof correspondingly adjusting said reflective surface against the bias of said spring.

References Cited in the file of this patent

UNITED STATES PATENTS

| | | |
|---|---|---|
| 1,499,640 | Copeland | July 1, 1924 |
| 1,630,217 | Rasor | May 24, 1927 |
| 2,573,127 | Von Bredow | Oct. 30, 1951 |
| 2,620,708 | Anderson | Dec. 9, 1952 |
| 2,696,142 | Langford | Dec. 7, 1954 |

FOREIGN PATENTS

| | | |
|---|---|---|
| 433,112 | Great Britain | Aug. 8, 1935 |

UNITED STATES PATENT OFFICE
CERTIFICATE OF CORRECTION

Patent No. 3,077,142                               February 12, 1963

Edwin B. Jacobson

It is hereby certified that error appears in the above numbered patent requiring correction and that the said Letters Patent should read as corrected below.

Column 12, line 22, after "therethrough" insert -- through --; lines 22 and 23, after "received," insert -- and an enlarged chamber portion defined by said body --; same line 23, before "elements" insert -- flexible --; lines 24 and 25, strike out "an enlarged chamber portion defined by said body"; line 25, strike out "flexible".

Signed and sealed this 29th day of October 1963.

(SEAL)
Attest:

ERNEST W. SWIDER
Attesting Officer

EDWIN L. REYNOLDS
Acting Commissioner of Patents